Sept. 5, 1939.  R. F. MULLEN  2,171,944
STEAM CAR HEATER
Filed July 9, 1936  3 Sheets-Sheet 1

Inventor
Raymond F. Mullen
By Blackmore, Spencer & Flint
Attorneys

Sept. 5, 1939.  R. F. MULLEN  2,171,944
STEAM CAR HEATER
Filed July 9, 1936  3 Sheets-Sheet 2
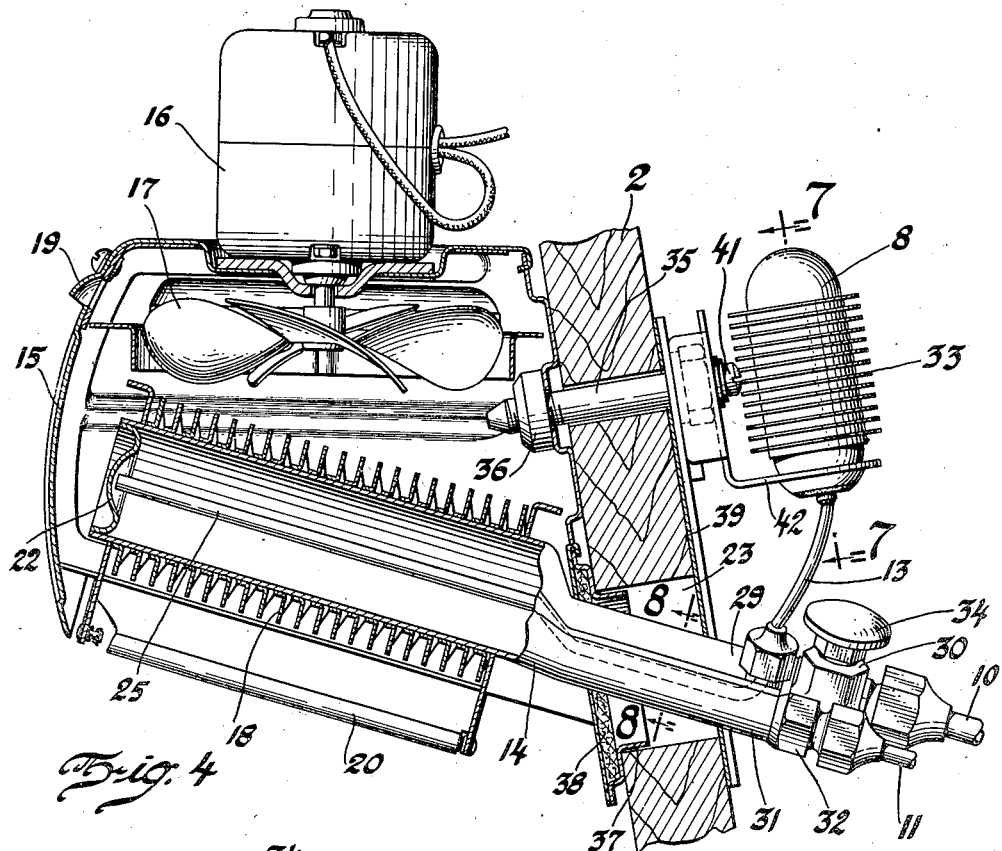
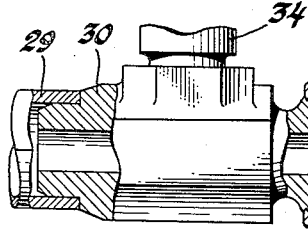
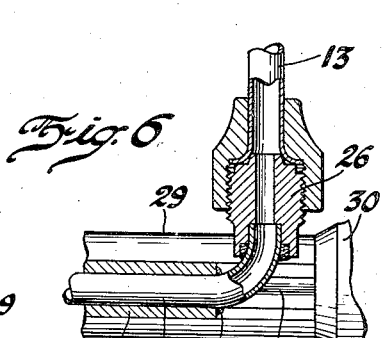
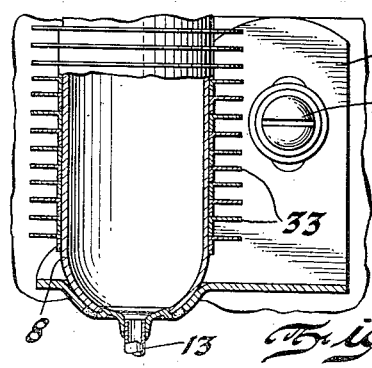
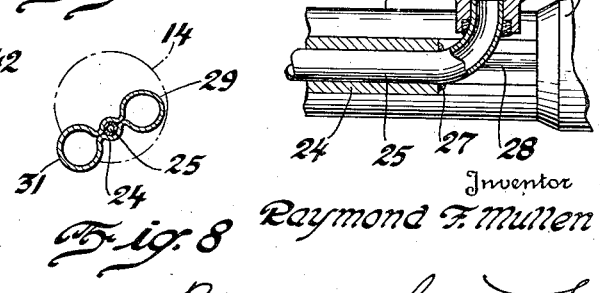

Sept. 5, 1939.   R. F. MULLEN   2,171,944
STEAM CAR HEATER
Filed July 9, 1936   3 Sheets-Sheet 3
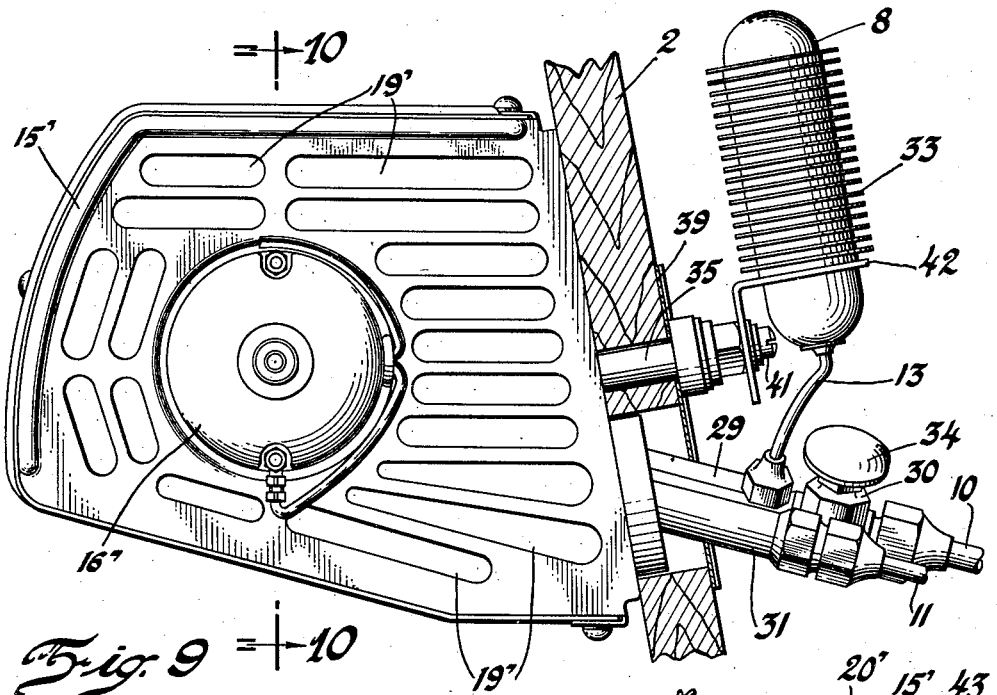
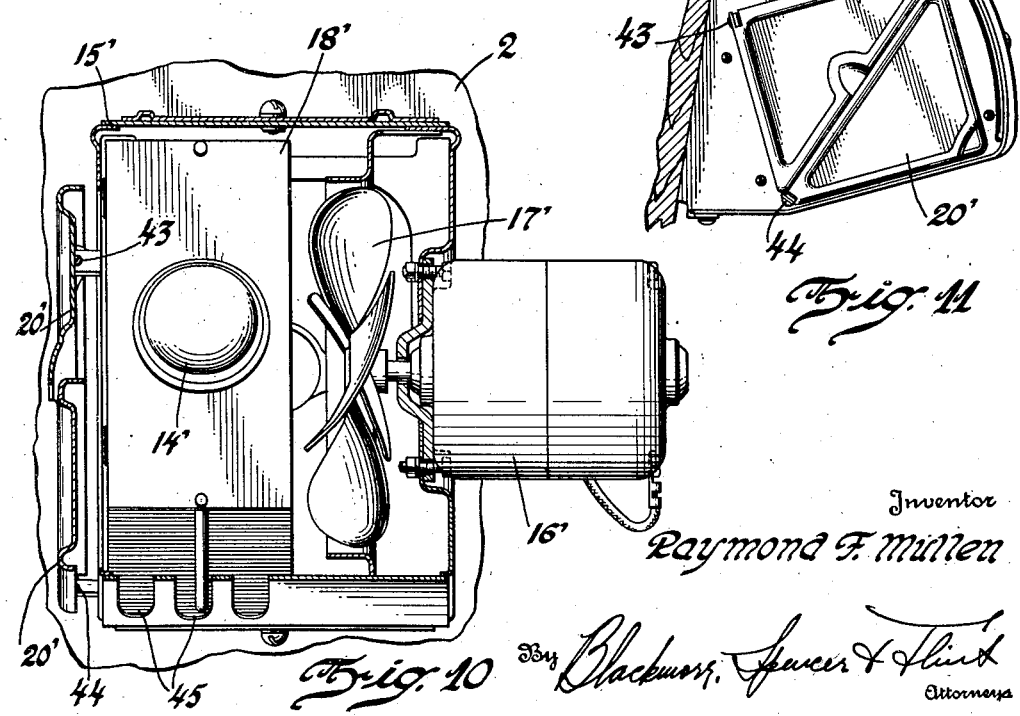

Patented Sept. 5, 1939

2,171,944

UNITED STATES PATENT OFFICE 2,171,944

STEAM CAR HEATER

Raymond F. Mullen, Rochester, N. Y., assignor to General Motors Corporation, Detroit, Mich., a corporation of Delaware Application July 9, 1936, Serial No. 89,763

2 Claims. (Cl. 257—137)

This invention relates generally to an improved heating system for motor vehicles, and more particularly to certain improvements in that type of heating system in which the waste heat from the exhaust gases of the internal combustion engine is utilized to generate steam which is supplied to a heater unit to heat the vehicle.

One object of this invention is to so construct the heater unit and heating system as to facilitate and simplify the installation thereof on a motor vehicle.

A further object is to provide a heater unit which is adapted to be mounted in the passenger compartment of the vehicle on the dash board with a portion of the radiator core extending through the dash board into the engine compartment for connection to other parts of the heating system.

A further object is to so construct and arrange the heater unit and air deflectors associated therewith as to provide an improved distribution of the heated air within the passenger compartment.

A further object is to provide a heater unit of simple and compact construction, and other objects reside in the novel combination and arrangement of parts and in the details of construction which will appear from the following description and the accompanying drawings, in which:

Fig. 4 is a longitudinal sectional view with parts in elevation, taken substantially on line 4—4 of Fig. 2.

Fig. 5 is a detail section taken substantially on line 5—5 of Fig. 3.

Fig. 6 is a detail section taken substantially on line 6—6 of Fig. 3.

Fig. 7 is a fragmentary sectional view taken substantially on line 7—7 of Fig. 4.

Fig. 8 is a cross section of the radiator core taken substantially on line 8—8 of Fig. 4.

Fig. 9 is a side elevation of a modification of the heater unit.

Fig. 10 is a transverse sectional view, with parts in elevation, taken substantially on line 10—10 of Fig. 9.

Fig. 11 is a side elevation of the heater unit of Fig. 9 on a reduced scale.

Figure 1:
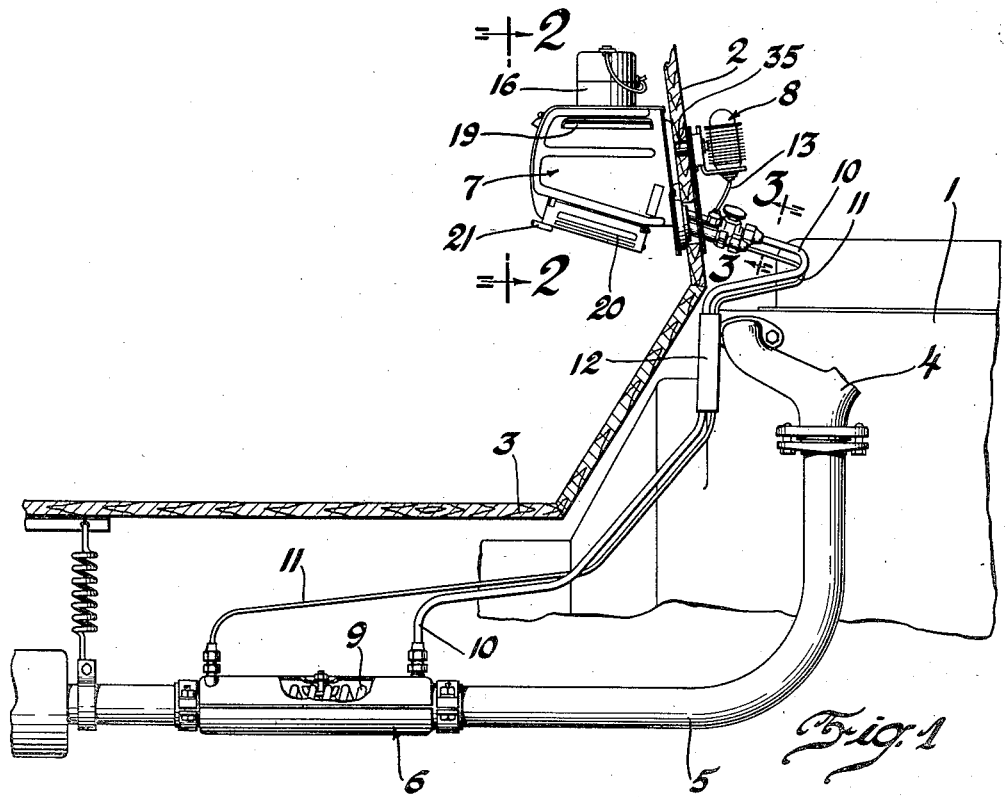
Fig. 1 is a diagrammatic side elevation of the heating system as applied to an automotive vehicle.

Referring first to Fig. 1, there has been shown diagrammatically only those parts of the usual automotive vehicle which are necessary for an understanding of the installation of the steam heating system. The internal combustion engine is indicated generally at 1 in the engine compartment which is separated from the body compartment in the usual manner by the dash 2 and floor boards 3. The engine includes the usual exhaust manifold 4 and exhaust pipe 5 and in this and other respects may be generally similar to standard practice.

The principal parts of the heating system, which is more fully described and claimed in my copending application Serial No. 714,365, filed March 7, 1934, consist of the steam generator or boiler unit indicated generally at 6, a heater unit indicated generally at 7 within the body compartment, and a pressure control unit indicated generally at 8 within the engine compartment.

The boiler unit 6 is provided with a steam forming chamber in the form of a tube 9 in which steam is generated by heat transfer from engine exhaust gases to the heating medium or liquid and this steam is supplied to a radiator core in the heater unit 7 through the steam supply conduit 10 and the condensate returned to the tube 9 through the condensate return conduit 11 which is of smaller diameter than conduit 10 with a connection 12 between these conduits intermediate the boiler unit and heater unit to facilitate the proper circulation of the heating medium as is fully set forth in the copending application referred to above.

As is also more fully described in said copending application, the pressure control unit 8 includes a closed chamber which is so constructed and connected to the radiator core of the heater 7 by a conduit 13 as to function to automatically regulate the amount of heating medium in circulation between the boiler and radiator to prevent the development of excessive pressure in the heating system.

Referring now to the details of construction and mounting of the heater unit 7 and the connection thereof to other parts of the heating system, the heater unit includes a radiator core 14 which is supported within the heater casing 15, as shown in Fig. 4. A vertically positioned electric motor 16 is mounted on the upper wall of the casing 15 and is adapted to drive the fan 17 within the casing above the radiator core which is provided on that portion within the casing with a plurality of heat radiating fins 18.

Figure 2:
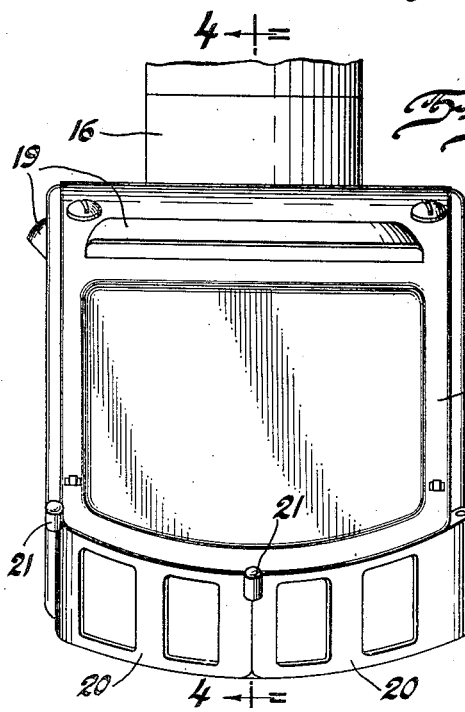
Fig. 2 is an enlarged front elevation of the heater unit taken on line 2—2 of Fig. 1.

The heater casing 15 is provided with air inlet louvers 19 in its front and side walls adjacent the fan 17 which functions to draw air through these louvers and force the air downwardly over the finned radiator core and the heated air is then discharged through the bottom of the heater casing into the passenger compartment. It is generally customary, because of space requirements, to locate the heater unit on the dash adjacent the right side of the vehicle, and to deflect the heated air towards the center of the vehicle or towards the driver, the bottom opening in the heater casing is provided with a pair of adjustable deflectors 20 which are each pivoted to the heater casing at the right side and may be opened downwardly to various extents to deflect the heated air to the left or permit some of the heated air, if desired, to be discharged downwardly. It should be noted that the deflectors 20 are shown in Fig. 2 in fully closed position and each deflector is provided at its left side with a protruding knob or handle 21 by which it may be manually adjusted about its pivot to any desired extent. To enhance the appearance and assist in the proper distribution of the heated air it should also be noted that the deflectors 20 are curved transversely and their pivots are inclined downwardly towards the rear of the heater unit.

As clearly shown in Fig. 4, the radiator core 14 comprises a single tube which is closed at its front end by a plug 22, and extends rearwardly of the heater casing with its rear end so formed as to provide for the connections to other parts of the heating system. This rear end of the radiator core is adapted to extend through an opening 23 in the dash into the engine compartment so that the connections to the heating system are outside of the passenger compartment which not only facilitates the installation of the heating system but also provides a safety factor by eliminating any connections within the passenger compartment.

The rear portion of the radiator core 14 is flattened and formed as shown in Fig. 8 to provide three parallel substantially cylindrical passages, the outer of which are of larger cross section than the intermediate passage. The intermediate passage 24 is adapted to receive the control tube 25 and as shown in Fig. 6, the wall of the intermediate passage does not extend to the end of the outer passages and the tube 25 is bent upwardly and provided with a screw-threaded terminal 26 for the connection of the conduit 13. The joint between the end of the intermediate passage and the tube 25 may be sealed by silver solder as shown at 27 and silver solder may also be employed to completely close the seams 28 in the inner sides of the outer passages along the portions thereof which extend beyond the end of the intermediate passage. The outer passage 29 is provided at its end with a terminal 30 for the connection of the steam supply conduit 10 and the outer passage 31 is provided at its end with a terminal 32 for the connection of the condensate return conduit 11.

Referring to Figs. 1 and 4, it will be seen that the radiator core 14 is positioned substantially horizontally but inclined downwardly towards the rear of the heater, and also that the rear portion of the radiator core is so formed that the passage 31 which is connected to the condensate return conduit is at a lower level than the passage 29 which is connected to the steam supply conduit so as to facilitate the proper circulation of the heating medium and provide for the return of the condensate through the conduit 11 to the boiler tube 9.

As appears from Fig. 4, the control tube 25 is extended within the radiator core 14 to the front end thereof and as noted above, is connected by the conduit 13 to the closed chamber of the pressure control. This pressure control chamber is provided with radiating fins 33 and is located within the engine compartment and functions, as is more fully set forth in my aforesaid pending application, to receive the air from the system and as the steam pressure in the system rises, steam enters this chamber and is condensed and thereby withheld from circulation between the radiator core and boiler until the pressure in the radiator core falls below that of the air which is compressed in the control chamber. Although this pressure control is adapted to prevent excessive pressure in the system a safety means is provided in the form of a pressure relief or rupture plug 34. As shown in the drawings, this plug 34 is secured on the terminal 30 in the engine compartment and it will be understood that the terminal 30 is provided with a suitable lateral passage to afford communication between the rupture plug and the system.

The heater unit 7 is secured to the dash 2 by the bolt 35 which extends through the dash into the nut 36 which may be fixed, as by welding, to the rear wall of the heater casing. The rear wall of the heater casing is formed with a flanged opening through which the rear end of the radiator core 14 extends and as shown in Fig. 4, the flange 37 of this opening is adapted to be received within the opening 23 in the dash to position the heater unit thereon about the bolt 35. The space between the rear wall of the heater casing and the radiator core where it passes through this wall may be sealed by the heat insulating gasket 38.

Figure 3:
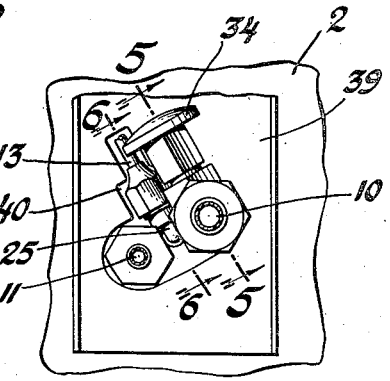
Fig. 3 is a fragmentary sectional view taken substantially on line 3—3 of Fig. 1.

On the engine side of the dash, the metal plate 39 is interposed between the head of the bolt 35 and the dash and this plate 39 extends across the opening 23 in the dash where it is provided with an opening 40 which is only of such size and shape as shown in Fig. 3, to permit the insertion of the rear end of the radiator core with terminals 26, 30 and 32 therethrough during mounting of the heater unit, after which the pressure relief plug 34 and the conduits 10, 11 and 13 are assembled therewith. The head of the bolt 35 is tapped to receive the screw 41 which serves to mount the flanged bracket 42 carrying the pressure control chamber.

Referring now to the modification of the heater unit shown in Figs. 9 to 11, similar reference numerals have been applied to those parts which correspond to the parts of the preceding figures of the drawings.

This heater unit differs from that already described in the relative arrangement of the motor and radiator and air deflectors.

In this modification the motor 16' is mounted horizontally on one side of the heater casing 15' and the fan 17' draws air through the inlet openings 19' and forces the air laterally over the radiator core 14' and radiating fins 18' and the heated air is discharged through an opening in the opposite side of the heater casing. The radiator core 14' is similar to the radiator core 14 of Fig. 4 but it will be noted that the radiating fins 18' extend substantially between the upper and lower walls of the heater casing whereas the fins 18 of Fig. 4 extend substantially between the side walls of the heater casing.

The air outlet opening in the side of the heater casing is provided with a pair of adjustable deflectors 20' which are pivotally mounted in the manner shown in Fig. 11. Each of the deflectors 20' is substantially triangular and the upper deflector is pivoted at 43 to the heater casing with the pivotal axis at the upper edge of the deflector diagonally arranged or sloping downwardly towards the rear of the casing. The lower deflector is pivoted at 44 to the heater casing with the pivotal axis at the upper edge of the deflector substantially parallel to the lower edge of the upper deflector which is at an angle of approximately 45° to the horizontal. With this diagonal mounting of the deflectors it will be seen that when opened to any desired extent they will not only direct heated air downwardly but also forwardly of the heater unit. A plurality of slotted openings 45 are also provided in the bottom of the heater casing as shown in Fig. 10 below the radiating fins 18' so that when the deflectors 20' are closed, heated air will be discharged downwardly through said openings.

Although the foregoing detailed description has related specifically to the construction shown in the drawings, it will be understood that the invention is not in any sense limited thereto but is susceptible of many modifications and alternative constructions which may be included within the spirit and scope of the invention as expressed in the appended claims.

I claim:

1. In a heater, a radiator core comprising a single tube, a portion of the length of said tube being substantially cylindrical, heat radiating fins secured on said cylindrical portion, and a portion of the length of said tube being flattened and so formed as to provide for the connection of a plurality of conduits thereto.

2. In a heater, the combination with a casing, of a motor driven fan and radiator core within said casing, a single bolt adapted to secure said casing to the dash of an automobile, said radiator core extending through said casing and adapted to extend through an opening in the dash, and means on said casing adapted to engage within said opening to position said casing relative thereto.

RAYMOND F. MULLEN.